(12) United States Patent
He et al.

(10) Patent No.: US 12,494,530 B2
(45) Date of Patent: Dec. 9, 2025

(54) BATTERY PACK AND ELECTRIC VEHICLE

(71) Applicant: MICROVAST POWER SYSTEMS CO., LTD., Huzhou (CN)

(72) Inventors: Cong He, Huzhou (CN); Bin Li, Huzhou (CN); Xiaoge Qiu, Huzhou (CN); Qiuming Gao, Huzhou (CN); Shengxian Wu, Huzhou (CN); Ningqiang Xiao, Huzhou (CN)

(73) Assignee: MICROVAST INC., Stafford, TX (US)

( * ) Notice: Subject to any disclaimer, the term of this patent is extended or adjusted under 35 U.S.C. 154(b) by 749 days.

(21) Appl. No.: 17/790,960

(22) PCT Filed: Jan. 17, 2020

(86) PCT No.: PCT/CN2020/072606
§ 371 (c)(1),
(2) Date: Jul. 6, 2022

(87) PCT Pub. No.: WO2021/142743
PCT Pub. Date: Jul. 22, 2021

(65) Prior Publication Data
US 2023/0021334 A1    Jan. 26, 2023

(51) Int. Cl.
*H01M 10/6554* (2014.01)
*H01M 10/613* (2014.01)
(Continued)

(52) U.S. Cl.
CPC ..... *H01M 10/6554* (2015.04); *H01M 10/613* (2015.04); *H01M 10/625* (2015.04); *H01M 50/502* (2021.01)

(58) Field of Classification Search
None
See application file for complete search history.

(56) References Cited

U.S. PATENT DOCUMENTS 6,517,966 B1    2/2003   Marukawa
11,283,121 B1*  3/2022   Boecker .............. H01M 50/249
(Continued)

FOREIGN PATENT DOCUMENTS

CN   102637836 A   8/2012
CN   104779419 A   7/2015
(Continued)

OTHER PUBLICATIONS

The extended European search report of EP application No. 20914687.7 issued on Oct. 31, 2023.
(Continued)

*Primary Examiner* — Scott J. Chmielecki
(74) *Attorney, Agent, or Firm* — Andrew C. Cheng

(57) ABSTRACT

Provided are a battery pack and an electric vehicle. The battery pack includes a case, a cooling plate assembly and an energy storage unit. The cooling plate assembly and the energy storage unit are arranged inside the case, and the cooling plate assembly at least includes a first cooling plate. The first cooling plate is fixed on the case, and the first cooling plate divides the case, in a Z-direction, into a first accommodating space which is located above the first cooling plate, and a second accommodating space which is located below the first cooling plate. The energy storage unit at least includes a first energy storage unit which is arranged inside the first accommodating space and fixed on the first cooling plate, and a second energy storage unit which is arranged inside the second accommodating space.

15 Claims, 3 Drawing Sheets

(51) Int. Cl.
H01M 10/625 (2014.01)
H01M 50/502 (2021.01)

(56) References Cited

U.S. PATENT DOCUMENTS

| | | | |
|---|---|---|---|
| 11,316,230 B1* | 4/2022 | Boecker | H01M 10/6556 |
| 2011/0020676 A1* | 1/2011 | Kurosawa | H01M 10/653 |
| | | | 429/62 |
| 2018/0175466 A1* | 6/2018 | Seo | H01M 10/6555 |
| 2020/0358127 A1* | 11/2020 | Terauchi | H01M 10/613 |

FOREIGN PATENT DOCUMENTS

| | | |
|---|---|---|
| CN | 107004922 A | 8/2017 |
| CN | 206610883 U | 11/2017 |
| CN | 207265192 U | 4/2018 |
| CN | 207282570 U | 4/2018 |
| CN | 108039527 A | 5/2018 |
| CN | 209232838 U | 8/2019 |
| CN | 211719646 U | 10/2020 |

OTHER PUBLICATIONS

International Search Report of PCT Patent Application No. PCT/CN2020/072606 issued on Oct. 22, 2020.
The first office action of CN patent application No. 202080091912.8 issued on Apr. 30, 2025.
The first search report of CN patent application No. 202080091912.8 issued on Apr. 30, 2025.

* cited by examiner

BATTERY PACK AND ELECTRIC VEHICLE

CROSS REFERENCE TO RELATED APPLICATIONS

This application is a 35 U.S.C. § 371 National Phase conversion of International (PCT) Patent Application No. PCT/CN2020/072606, filed on Jan. 17, 2020. The contents of the above-identified application are incorporated herein by reference. The PCT International Patent Application was filed and published in Chinese.

TECHNICAL FIELD

The present application relates to the technical field of batteries, and in particular, to a battery pack and an electric vehicle.

BACKGROUND

Traditional battery pack adopts the structure of single-layer battery module, which leads to the space utilization and the energy density of electric vehicle to be insufficient. In order to solve this problem, in the prior art, battery modules are installed in the battery pack in a laminated structure. However, in order to ensure the structural stability of the battery pack, a fixing frame for supporting the upper battery modules needs to be added in the battery pack, which leads to complex structure and does not meet the lightweight design requirements of the battery pack.

SUMMARY

An embodiment of the present application provides a battery pack, which can greatly improve the space utilization rate of the battery pack, has simple structure and is easy to install.

The technical solution provided by the embodiment of the present application is as follows:

A battery pack includes a case, a cooling plate assembly and an energy storage unit. The cooling plate assembly and the energy storage unit are arranged inside the case. The cooling plate assembly at least includes a first cooling plate. The first cooling plate is fixed on the case. The first cooling plate divides the case, in the Z-direction, into a first accommodation space and a second accommodation space. The second accommodation space is located below the first cooling plate, and the first accommodation space is located above the first cooling plate. The energy storage unit at least includes a first energy storage unit and a second energy storage unit. The second energy storage unit is arranged in the second accommodation space. The first energy storage unit is arranged in the first accommodation space, and the first energy storage unit is fixedly arranged on the first cooling plate. The Z-direction is the height direction of the case. The first cooling plate not only realizes the cooling function, but also fixedly supports the first energy storage unit, which greatly improves the space utilization rate of the battery pack, has simple structure and is easy to install. The first energy storage unit is in thermal contact with the first cooling plate to ensure the cooling efficiency of the first cooling plate to the first energy storage unit.

The cooling plate assembly further includes a second cooling plate. The second cooling plate is arranged between the bottom surface of the case and the bottom surface of the second energy storage unit. The second cooling plate is fixedly connected with the bottom surface or side surface of the case. The second cooling plate is in thermal contact with the second energy storage unit. The second energy storage unit is fixedly connected with the bottom surface of the case.

At least one second supporting member is provided on the second energy storage unit. The second supporting member protrudes above the upper surface of the second energy storage unit. The first cooling plate is connected with the second supporting member to improve the bearing capacity and structural stability of the first cooling plate and effectively prevent the upper surface of the second energy storage unit from being squeezed.

The first energy storage unit includes at least two first battery groups arranged parallel to each other, and two adjacent first battery groups are connected with each other. The at least one second supporting member is arranged corresponding to the junction of the two adjacent first battery groups in the Z-direction.

The first battery group includes at least two first battery modules arranged parallel to each other, and two adjacent first battery modules are connected with each other. The at least one second supporting member is arranged corresponding to the junction of the two adjacent first battery modules in the Z-direction. When the battery pack vibrates up and down during the driving of the vehicle, the junction of two adjacent first battery groups and the junction of two adjacent first battery modules are easy to produce shear force on the first cooling plate. By setting second supporting members at the corresponding positions under the areas of the first cooling plate bearing the shear force, the overall strength of the first cooling plate can be effectively enhanced so as to prevent deformation and damage of the first cooling plate.

The battery pack further includes a battery management system mounting plate arranged inside the case. The battery management system mounting plate is arranged above the first energy storage unit and fixedly connected with the first energy storage unit.

A first supporting member is provided on the first energy storage unit. The first supporting member protrudes above the upper surface of the first energy storage unit. The battery management system mounting plate is connected with the first supporting member to effectively prevent the upper surface of the first energy storage unit from being squeezed and also facilitate installation.

The first supporting member and the second supporting member are each in a block structure or a strip structure.

The second energy storage unit includes two second battery groups arranged parallel to each other, and two adjacent second battery groups are connected with each other. The second battery group includes at least two second battery modules arranged parallel to each other, and two adjacent second battery modules are connected with each other.

The embodiment of the present application further provides an electric vehicle, including the above battery pack.

The embodiment of the present application provides a battery pack and an electric vehicle. Compared with the prior art, the first energy storage unit is fixedly supported by the first cooling plate, which can effectively dissipate heat and greatly improve the space utilization rate of the battery pack, and has simple structure and is easy to install. The upper surfaces of the first energy storage unit and the second energy storage unit are respectively provided with the first supporting member and the second supporting member, which can effectively prevent the upper surfaces of the first energy storage unit and the second energy storage unit from being squeezed, avoid the deformation and damage of the first cooling plate and the battery management system mounting plate, and improve the structural stability of the battery pack.

BRIEF DESCRIPTION OF THE DRAWINGS

As shown in FIGS. 1-5: 100—case, 110—upper case, 120—lower case, 200—cooling plate assembly, 210—first cooling plate, 220—second cooling plate, 300—energy storage unit, 310—first energy storage unit, 311—first supporting member, 312—first battery group, 3121—first battery module, 313—first connecting member, 320—second energy storage unit, 321—second supporting member, 322—second battery group, 3221—second battery module, 323—second connecting member, 400—battery management system mounting plate.

DETAILED DESCRIPTION OF PREFERRED EMBODIMENTS

In order to make the above objects, features and advantages of the present application clear and easy to understand, specific embodiments of the present application are described in detail below in combination with the accompanying drawings. It should be noted that the drawings of the present application adopt a simplified form and use an imprecise proportion, and are only used as the purpose for facilitating to clearly illustrate the embodiments of the present application.

Figure 1:
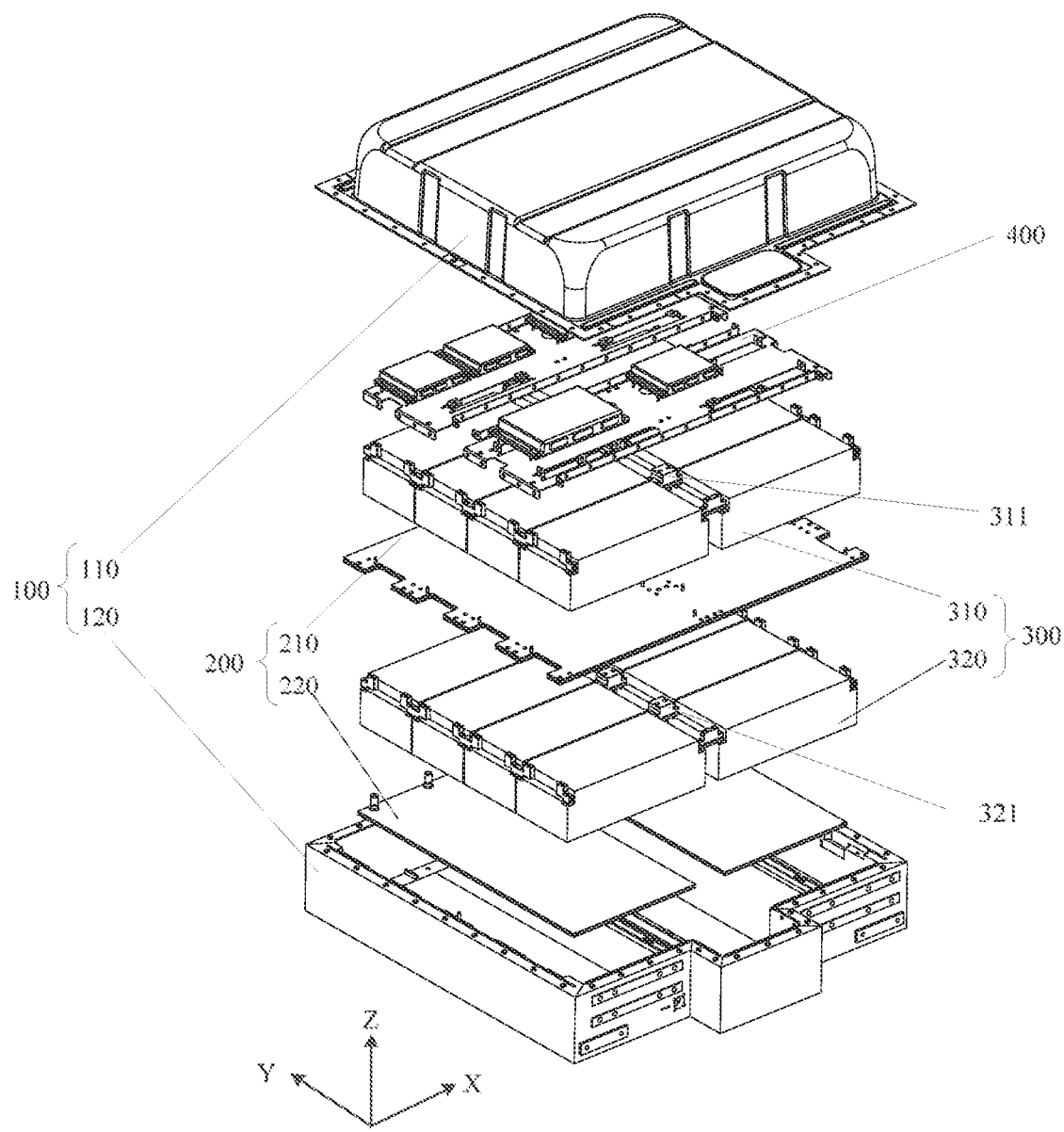
FIG. 1 is a structural diagram of a battery pack provided by an embodiment of the present application.

This embodiment provides a battery pack, as shown in FIG. 1, including a case 100, a cooling plate assembly 200, an energy storage unit 300, and a battery management system mounting plate 400. The cooling plate assembly 200 and the energy storage unit 300 are arranged inside the case 100.

As shown in FIG. 1, the case 100 includes a lower case 120 and an upper case 110 covered on the lower case 120. The cooling plate assembly 200 includes a first cooling plate 210 and a second cooling plate 220. The first cooling plate 210 is arranged inside the case 100 and divides the case 100 into a first accommodation space and a second accommodation space in the Z-direction. The two ends of the first cooling plate 210 in the X-direction are fixedly connected with the inner wall of the lower case 120. The second accommodation space is located below the first cooling plate 210, and the first accommodation space is located above the first cooling plate 210. The energy storage unit 300 includes a first energy storage unit 310 and a second energy storage unit 320. The second energy storage unit 320 is arranged in the second accommodation space, and the second cooling plate 220 is arranged between the bottom surface of the lower case 120 and the second energy storage unit 320. The second cooling plate 220 is fixedly connected with the bottom surface of the lower case 120, and the second cooling plate 220 is in thermal contact with the second energy storage unit 320. The first energy storage unit 310 is arranged in the first accommodation space and fixedly connected with the first cooling plate 210, and the first energy storage unit 310 is in thermal contact with the first cooling plate 210. The battery management system mounting plate 400 is arranged above the first energy storage unit 310. The battery management system mounting plate 400 is fixedly connected with the first energy storage unit 310.

Figure 2:
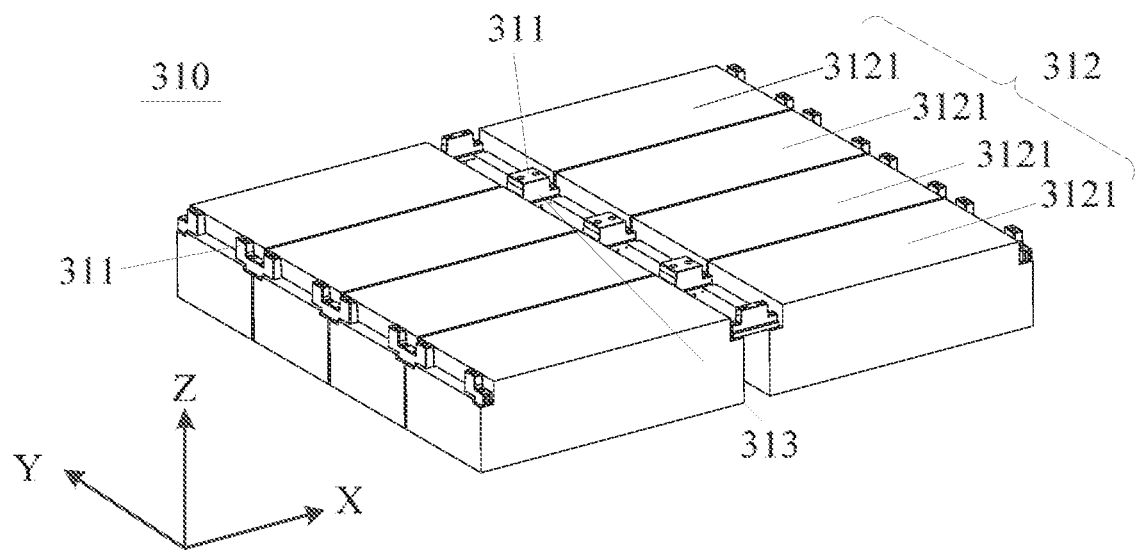
FIG. 2 is a structural diagram of the first energy storage unit provided by the embodiment of the present application.
Figure 3:
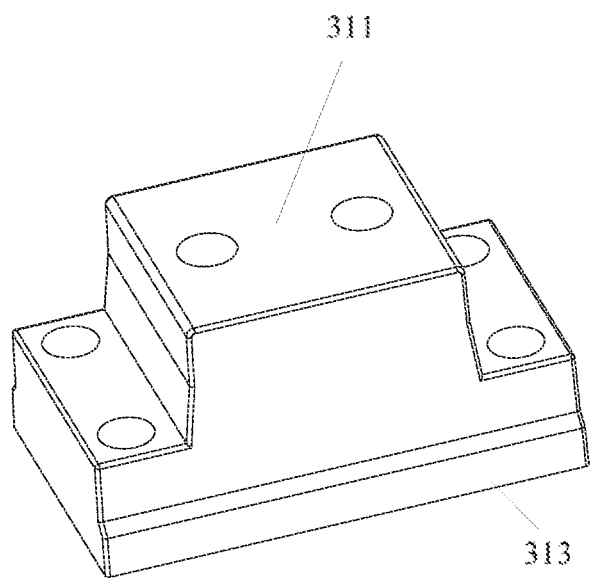
FIG. 3 is a schematic diagram of the first connecting member and the first supporting member provided by the embodiment of the present application.

As shown in FIGS. 1-3, the first energy storage unit 310 includes a plurality of first connecting members 313 distributed in the Y-direction and two first battery groups 312 arranged parallel to each other in the X-direction. The two first battery groups 312 are fixedly connected to each other through the first connecting members 313. The two ends of each first battery group 312 in the X-direction are fixedly connected with the first cooling plate 210 by bolts. Each first battery group 312 includes four first battery modules 3121 arranged parallel to each other in the Y-direction, and every two adjacent first battery modules 3121 are fixedly connected to each other. The junction of the two first battery groups 312 and the two ends of the first energy storage unit 310 in the X-direction are provided with first supporting members 311. The first supporting members 311 at the junction of the two first battery groups 312 are integrally formed with the corresponding first connecting members 313. The first supporting members 311 protrude above the upper surface of the first battery groups 312, and the battery management system mounting plate 400 is fixedly connected with the first supporting members 311.

Figure 4:
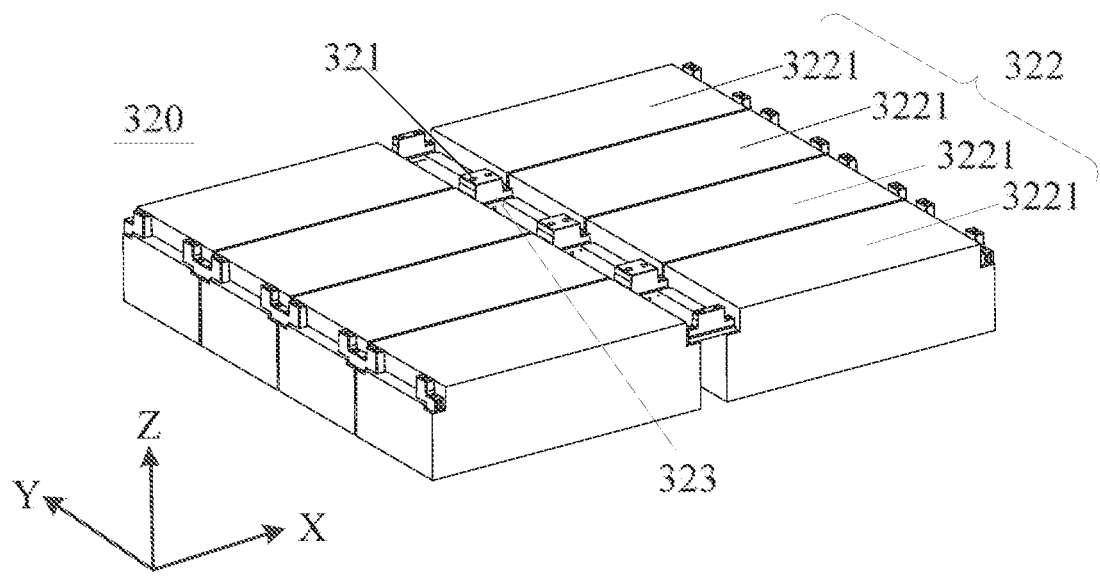
FIG. 4 is a structural diagram of the second energy storage unit provided by the embodiment of the present application.
Figure 5:
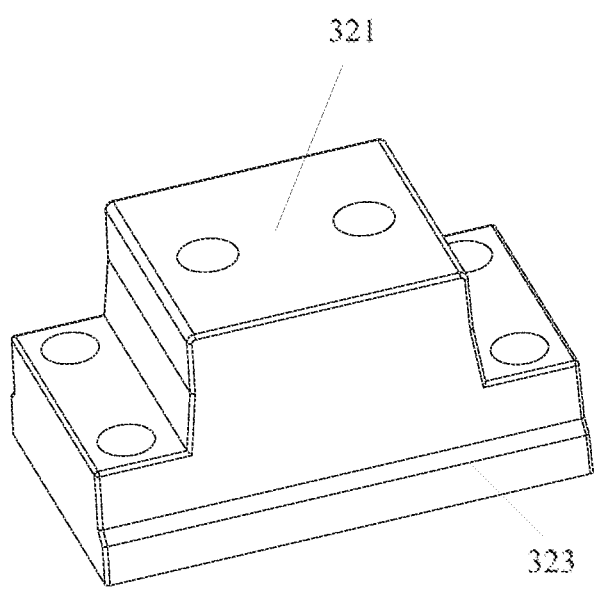
FIG. 5 is a schematic diagram of the second connecting member and the second supporting member provided by the embodiment of the present application.

As shown in FIGS. 1 and 4-5, the second energy storage unit 320 includes a plurality of second connecting members 323 distributed in the Y-direction and two second battery groups 322 arranged parallel to each other in the X-direction. The two second battery groups 322 are fixedly connected to each other through the second connecting members 323. The two ends of each second battery group 322 in the X-direction are fixedly connected with the bottom surface of the case 100 by bolts. Each second battery group 322 includes four second battery modules 3221 arranged parallel to each other in the Y-direction, and every two adjacent second battery modules 3221 are fixedly connected to each other. The plurality of second connecting members 323 are each provided with a second supporting member 321 thereon, the second supporting members 321 protrude above the upper surface of the second battery groups 322, and the first cooling plate 210 is connected with the second supporting members 321. The plurality of second supporting members 321 are arranged corresponding to the junction of the two first battery groups 312 in the Z-direction, and the plurality of second supporting members 321 are arranged respectively corresponding to the junctions of the four first battery modules 3121 in the Z-direction. In this embodiment, the second supporting member 321 is integrally formed with the second connecting member 323.

The embodiment further provides an electric vehicle including the above battery pack.

What is claimed is:
1. A battery pack comprising;
a case;
a cooling plate assembly; and
an energy storage unit;
wherein the cooling plate assembly and the energy storage unit are arranged inside the case, the cooling plate assembly at least comprises a first cooling plate securely disposed within the case dividing the case along a Z-direction into a first accommodation space located above the first cooling plate and a second accommodation space located below the first cooling plate;

wherein the energy storage unit at least comprises a first energy storage unit disposed in the first accommodation space and securely attached to the first cooling plate, and a second energy storage unit disposed in the second accommodation space; and wherein at least one second supporting member is provided on an upper surface of the second energy storage unit, and is directly attached to the first cooling plate.

2. The battery pack according to claim 1, wherein the first energy storage unit is in thermal contact with the first cooling plate.

3. The battery pack according to claim 1, wherein the cooling plate assembly further comprises a second cooling plate, the second cooling plate is arranged between a bottom surface of the case and the second energy storage unit, and the second cooling plate is in thermal contact with the second energy storage unit.

4. The battery pack according to claim 1, wherein the first energy storage unit comprises at least two first battery groups arranged parallel to each other, two adjacent first battery groups are connected with each other, and the at least one second supporting member is arranged corresponding to a junction of the two adjacent first battery groups in the Z-direction.

5. The battery pack according to claim 4, wherein each of the at least two first battery groups comprises at least two first battery modules arranged parallel to each other, two adjacent first battery modules are connected with each other, and the at least one second supporting member is arranged corresponding to a junction of the two adjacent first battery modules in the Z-direction.

6. The battery pack according to claim 1, wherein the first energy storage unit comprises at least two first battery groups arranged parallel to each other, each of the at least two first battery groups comprises at least two first battery modules arranged parallel to each other, two adjacent first battery modules are connected with each other, and the at least one second supporting member is arranged corresponding to a junction of the two adjacent first battery modules in the Z-direction.

7. The battery pack according to claim 1, further comprising a battery management system mounting plate arranged inside the case, and the battery management system mounting plate being arranged above the first energy storage unit.

8. The battery pack according to claim 7, wherein a first supporting member is provided on the first energy storage unit, and the battery management system mounting plate is fixedly connected with the first supporting member.

9. The battery pack according to claim 8, wherein the first supporting member protrudes above an upper surface of the first energy storage unit.

10. An electric vehicle comprising the battery pack according to claim 1.

11. An electric vehicle comprising the battery pack according to claim 5.

12. The battery pack according to claim 1, wherein the first energy storage unit comprises a plurality of first connecting members and at least two first battery groups arranged parallel to each other and connected to each other through the plurality of first connecting members.

13. The battery pack according to claim 12, wherein a junction of the at least two first battery groups and two ends of the first energy storage unit are provided with first supporting members, and the first supporting members at the junction of the at least two first battery groups are integrally formed with the first connecting members provided at the junction of the at least two first battery groups.

14. The battery pack according to claim 1, wherein the second energy storage unit comprises a plurality of second connecting members and at least two second battery groups arranged parallel to each other and connected to each other through the plurality of second connecting members.

15. The battery pack according to claim 14, wherein a plurality of second supporting members are provided on the second energy storage unit, a junction of the at least two second battery groups and two ends of the second energy storage unit are provided with the plurality of second supporting members, and the second supporting members at the junction of the at least two second battery groups are integrally formed with the second connecting members provided at the junction of the at least two second battery groups.

* * * * *